United States Patent [19]
Simon et al.

[11] Patent Number: 5,859,406
[45] Date of Patent: Jan. 12, 1999

[54] WELDING ROD METHOD AND APPARATUS

[76] Inventors: R. E. Simon, 603 Boulder Cir., Dayton, Nev. 89403; L. E. Mann, 2222 Dant Blvd., Reno, Nev. 89509

[21] Appl. No.: 702,813

[22] Filed: Aug. 26, 1996

Related U.S. Application Data

[63] Continuation-in-part of Ser. No. 585,843, Jan. 16, 1996, abandoned.

[51] Int. Cl.⁶ .................................................. B23K 35/365
[52] U.S. Cl. ......................................................... 219/145.23
[58] Field of Search ........................... 219/145.1, 145.23, 219/145.41, 146.22

[56] References Cited

U.S. PATENT DOCUMENTS

| | | | |
|---|---|---|---|
| 2,023,364 | 12/1935 | Crapo | 219/145.1 |
| 3,321,944 | 5/1967 | Ball | 219/145.23 |
| 3,377,461 | 4/1968 | Ballass et al. | 219/145.41 |
| 3,466,907 | 9/1969 | Landis et al. | 219/145.1 |
| 4,426,428 | 1/1984 | Kammer et al. | 219/145.23 |
| 4,913,927 | 4/1990 | Anderson | 219/146.22 |
| 5,514,422 | 5/1996 | McCune | 427/449 |

*Primary Examiner*—Clifford C. Shaw
*Attorney, Agent, or Firm*—Herbert C. Schulze

[57] ABSTRACT

A method and apparatus for producing high quality welding rod including a first forming of an ingot under triple vacuum forming techniques; a continuous mechanical de-scaling at all stages, including, but not limited to, final drawing; performing ultrasonic inspection; using boron nitride covered by potassium silicate during billet extrusion; performing an unusual electrolytic purification process, and a final controlled packaging process.

3 Claims, 4 Drawing Sheets

WELDING ROD METHOD AND APPARATUS

CROSS REFERENCE TO RELATED PATENT APPLICATION

This patent application is a Continuation in Part of our presently pending application Ser. No. 08/585,843 filed Jan. 16, 1996 for Method and Apparatus for Hot Shaping Cobalt-Tungsten Alloys to Geometric Forms, now abandoned.

BACKGROUND OF THE INVENTION

I. Field of the Invention

This invention is in the general field of welding rods;

The invention is more particularly related to an improved method and apparatus for forming a welding rod of unusual and and superior quality.

II. Description of the Prior Art

The prior art in this field is primarily found in U.S. Pat. Nos. 2,005,902; 3,225,508; 3,498,094; 3,788,820; 3,394,213; 3,505,039; 4,209,122; 4,354,880; 4,777,710; 5,481,788 and in our co-pending application Ser. No. 08/585,843, referred to above.

The present invention relates to an unusual combination of steps incorporating some of the steps previously used in practicing certain of the above referenced patents and the presently pending application.

We have now further conceived and perfected further unique methods and apparatus. With these new developments, we believe we have opened the door to absolutely new, unique, and unanticipated methods and apparatus.

SUMMARY OF THE INVENTION

Particularly in the area of high-tech welding, and most particularly in connection with sensitive welding, such as in aircraft, and the like, the quality of welding rod (also referred to as "wire", "electrodes", and the like, as is known to those skilled in the art) must be superior and free of contaminants.

The previously mentioned United States patents addressed the production of superior welding rods, and controlling the contaminants therein.

We have now conceived and perfected a unique method and apparatus for producing most superior quality welding rod with virtually no contaminants.

Fundamentally, we have developed a multi-staged method, and the apparatus to perform the method, by which we produce very superior welding rod. We now have conceived and developed the following modifications of our previously disclosed invention:

1: Previously, and consistent with the invention of which this is a continuation, there was a simple vacuum forming of ingots, billets, bars, and rods. We have expanded on this and have now added multiple vacuum forming of these operations.

2: We have now added center less grinding/machining to all stages of the process for the outer surfaces of ingots or other shapes;

3: We have added means for ultra sonic inspection and seam free turning of bars and coils;

4: We now remove tenacious high temperature oxides at all stages, by utilizing the ultra sonic and mechanical means described;

5: We now continually polish the redraw bars at all stages, as previously or subsequently described herein;

6: We have already described the electrolytic cleaning, previously and/or subsequently referred to;

7: We continuously use water assisted compression on wire surface from entry to exit;

8: We interpass vacuum annealing at appropriate (four, for example) pressure;

9: We now add rare earths, heretofore not found in the prior art, to stabilize the metallurgy shape of the product.

10: We have added additional controlled packaging of the final product to extend useful and reliable life. In conjunction with our controlled packaging, we have now added additional features, including a chemical combination in an extruded package of our welding rod which is most effective and unusual.

We accomplish all of this by constant attention to physical removal of any and all scale and surface impurities at all stages, and by the attention to the steps mentioned, which are not known to us to have ever, heretofore, been used by any producer of this, or a similar, product.

We commence with the purest ingots formed by a double vacuum process. This consists of melting by vacuum induction plus vacuum arc remelt. After the ingot is formed, we take a sample slice and analyze this. If the ingot appears of generally satisfactory quality, we then completely machine the exterior surfaces removing all scale or other surface imperfections. Next, we again vacuum a second and third time—repeating the scale removal and inspection, supplemented by ultra sonic inspection.

At all stages of the cogging, the preheat and reheat temperatures are carefully controlled. Ends of billets are constantly cropped as indicated by ultrasonic inspection. All de-scaling is by mechanical means to avoid introduction of gasses, or other impurities. We use seam free turning and/or center less grinding to accomplish this. We continually crop the bars and coils.

Before the final actual drawing of the wire or rod, the normal process involves annealing and pickling of the redraw rod. This forms an intentionally rough surface to retain lubricant for the wire drawing. In our method, we remove surface oxides at this stage by seam free turning supplemented by center less grinding and descaling as may be indicated by repeated ultrasonic and other inspections. The redraw rod is polished in our method to achieve a completely smooth surface before the wire forming process. We do not use lubricants in the drawing.

In the usual wire drawing process the forces are tangential to the wire. We use a process in which the forces are perpendicular, or non-tangential. We draw in compression, as opposed to, tension, which is customary in other processes. Thus we eliminate the shear forces which produce minute tears or scratches or other defects on the surface of the wire, thus providing a plethora of possibilities of surface contamination.

We now go to a critical stage. We have perfected a method, and apparatus, for electrolytic cleaning of the wire (rod). This is described in the following description of a preferred embodiment. At this phase, the wire is given the ultimate cleansing.

We have developed a unique electrolytic cleansing system which is finally used to remove any possible contaminants. In this system we use continuous water assisted compression on the wire surface in rolling the redraw bars.

Not satisfied with this final, unusual, result, we now interpass vacuum annealing at barometric pressure four (4)

The final step of our highly controlled system is the controlled packaging we use. The spools of wire (or packages of rods) are enclosed, with proper identifying information, in vapor barrier packages with adequate desiccants. Additionally, means are provided for air evacuation and/or introduction of inert gases.

Lastly we have added the utilization of Boron Nitride as a lubricant and inhibitor for metallurgical bonding and diffusion of metal powders to rods during billet extrusion heating and extrusion cycles. We have enhanced this use of Boron Nitride by sealing the Boron Nitride coating with a Potassium Silicate solution which reduces the possibility of inadvertent chipping during the packing of the rods.

An object of this invention is to provide a method and apparatus for producing high quality welding rod;

Another object of this invention is to provide contaminant-free welding rod;

Another object of this invention is to provide electrolytic, water pressure assisted cleansing of welding rod;

Another object is to provide means for removing high temperature oxides at all stages of welding rod, or wire, production;

Another object of this invention is to provide for continuous mechanical cleansing of the surfaces of welding rod, or wire, during its production;

Another object of this invention is to provide controlled packaging of the welding rod;

Another object of this invention is to provide for the use of Boron Nitride and Potassium Silicate coatings for lubrication and protection during billet extrusion.

The foregoing, and other, objects and advantages of this invention will be understood by those skilled in the art by a review of the following description of a preferred embodiment in conjunction with a review of the appended drawings.

DESCRIPTION OF A PREFERRED EMBODIMENT

Figure 1:
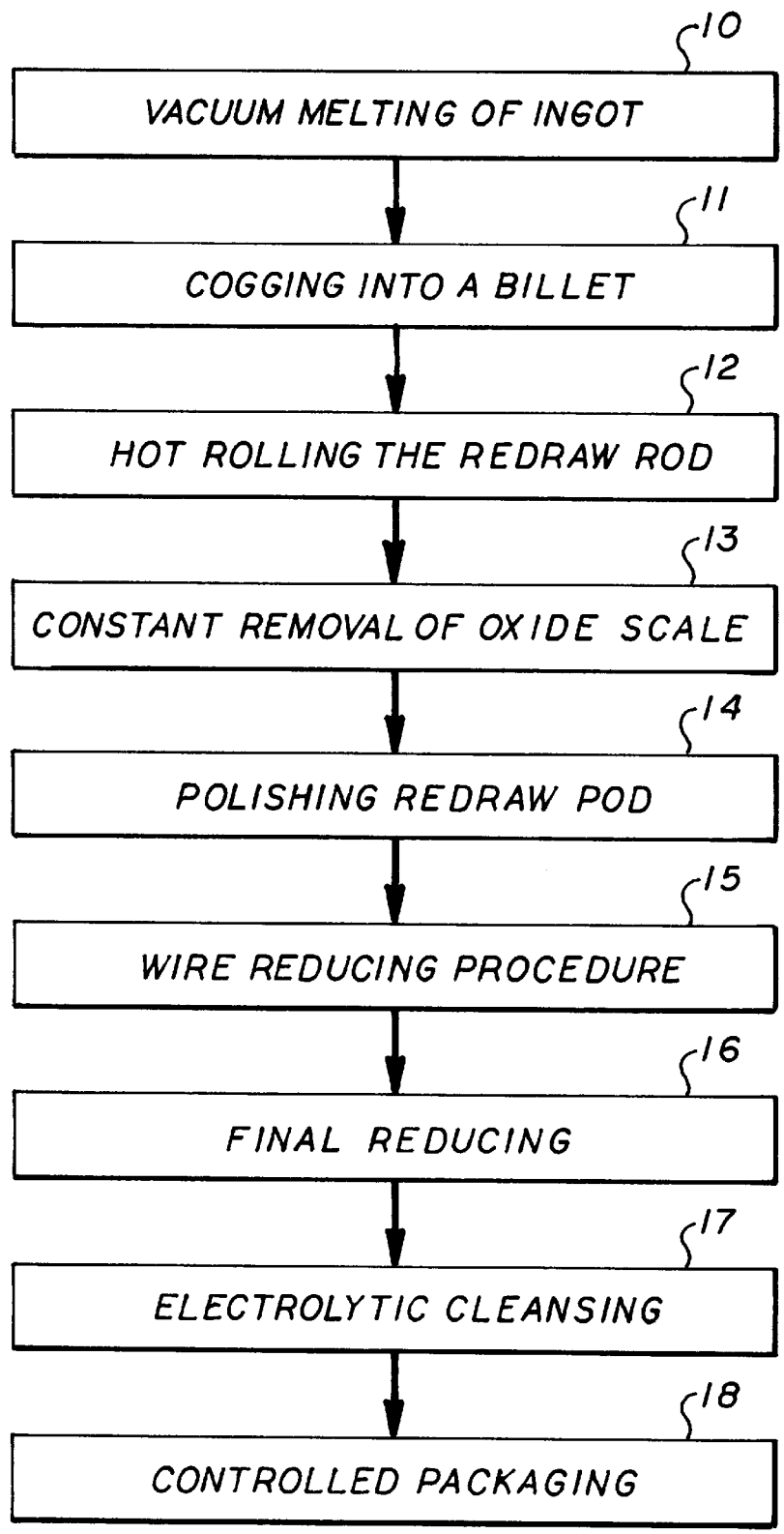
FIG. 1 is a block diagram illustrating the various phases and operations involved in this method as originally presented in our application Ser. No. 08/201,371, filed Feb. 24, 1994, now U.S. Pat. No. 5,481,788.
Figure 1A:
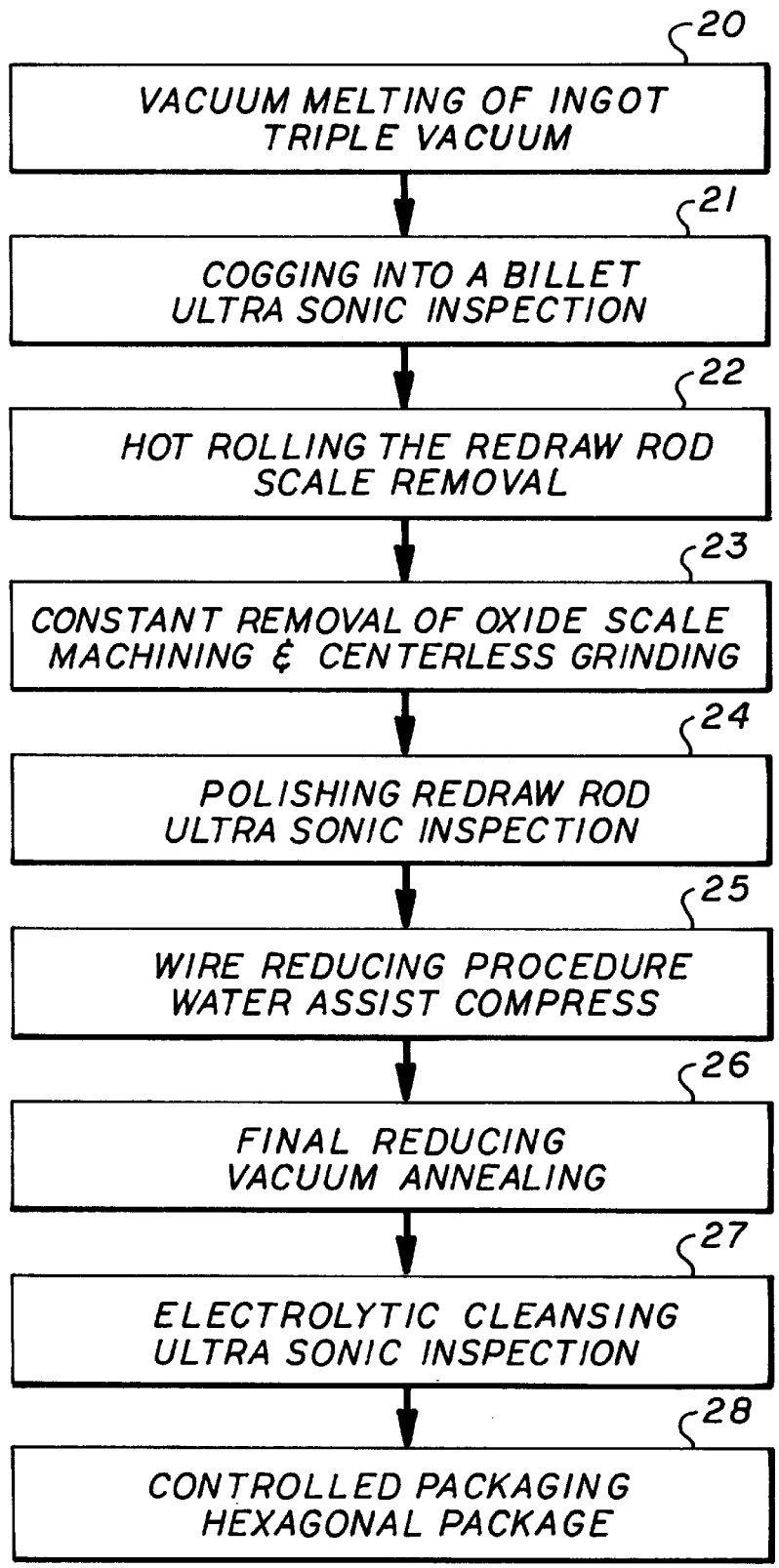
FIG. 1A is a block diagram the same as FIG. 1, but with additional steps we have now devised.

FIG. 1 shows the entire method of this invention, prior to the inventive steps added to this invention. FIG. 1A shows the steps with which we are now involved. Some of the steps were conventional—but not necessarily, nor even considered, conventional in order nor in practice, when considered with the present invention. The uniqueness of the method will be apparent to those skilled in the art.

FIGS. 1 and 1A should be considered together:

At block diagram position 10 the ingots are formed by vacuum melting and there is an unusual, but important, mechanical machining. At 20 we now add triple vacuum melting;

At position 11 cogging is performed but with mechanical de-scaling. At 21 we now add ultra sonic inspection and cleaning (the means for doing this are known to those skilled in the ultrasonic arts—however, to our knowledge this is a new application of such art to the field of welding rod production);

At position 12 the hot rolled redraw bar is subjected to seam free turning to remove surface oxides. At 22, we have now added center less grinding and continue with ultra sonic inspection;

At position 13 there is mentioned the continuous removal of oxide scale. At 23 there is further seam free machining and center less grinding for meticulous removal of tenacious high temperature oxides;

At position 14 there is the important, and normally, in the past, not performed, polishing of the rod. At 24 we have added further ultra sonic inspection and treatment;

At position 15 the wire reducing procedure is performed. At 25 water assisted compression on the wire or rod surface is performed;

At position 16 there is the final wire producing, reduction, and polishing. At 26 we introduce vacuum annealing at a barometric pressure of four millimeters of mercury;

At position 17 there is the unique electrolytic cleansing operation. At 27 we have added further final ultra sonic inspection;

At 18 is the controlled packaging. At 28 we have added the final packaging steps which are important enough that they should be exemplified upon.

Packaging is most important, because even though we have now produced a superior product with our unusual techniques, the product can deteriorate over time if not properly protected. We believe there is no packaging system for a product such as ours which contains as many unique and important protective measures.

Figure 1B:
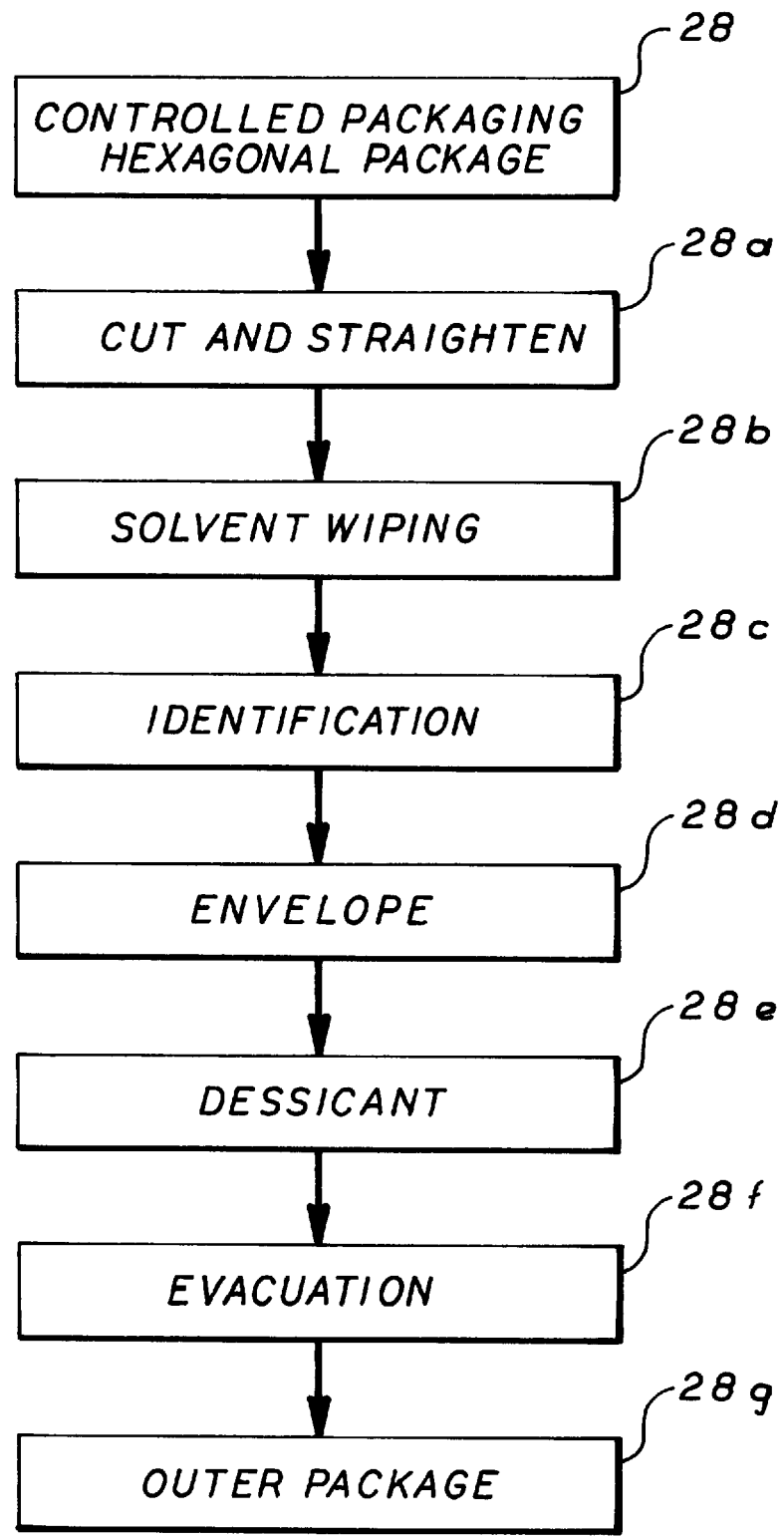
FIG. 1B is block diagram showing steps utilized in our packaging system.

FIG. 1B is a block diagram showing the steps involved in a complete packaging system we have developed for straight rods. At 28a we cut and straighten lengths; at 28b we hand wipe, using acetone, or other suitable solvent, each cut and straightened length; At 28c we attach an identification flag to each length—we, also, maintain a record of each run and package, with chemical analysis and certified test reports; At 28d we place the lengths in vapor barrier foil envelopes; At 28e we add desiccant within the envelopes; At 28f we evacuate all air from the envelopes and replace with inert gas and seal the vapor barrier envelopes; At 28g a final outer protective package is utilized to protect against damage to the envelopes.

Within the packages, we utilize a hexagonal packing pattern to facilitate cleaning and shaping.

Figure 2:
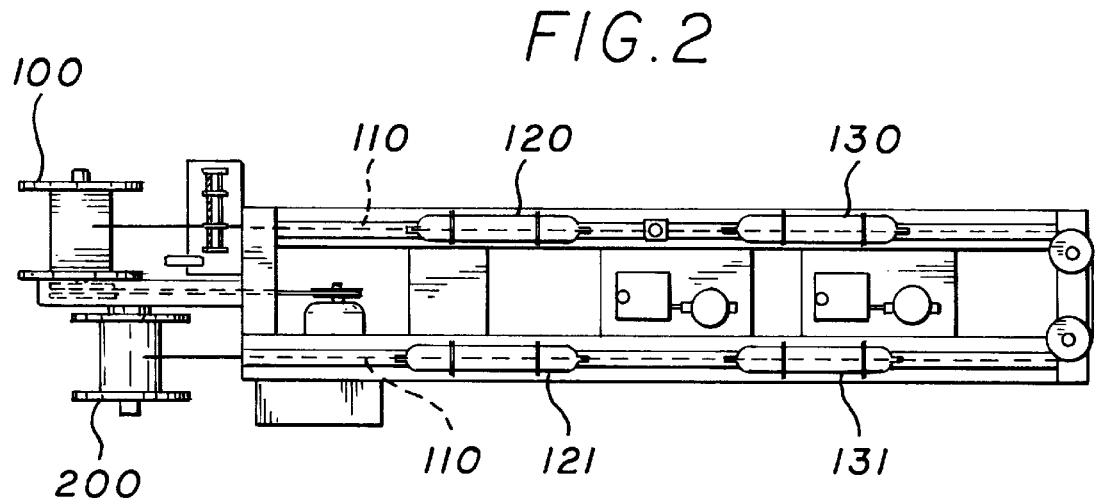
FIG. 2 is a schematic top elevation view of the electrolytic final cleaning operation.
Figure 3:
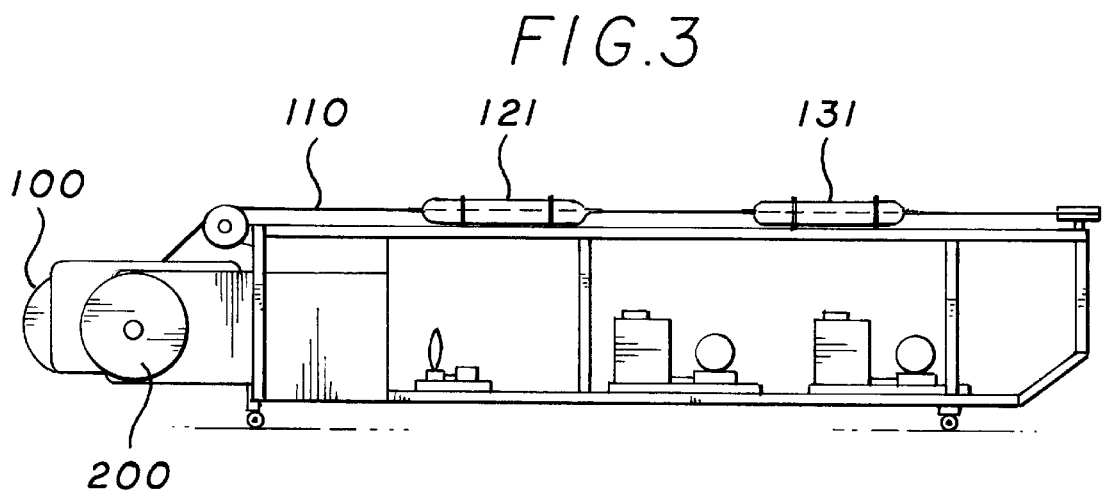
FIG. 3 is a side elevation view of the mechanism of FIG. 2.

FIGS. 2 and 3 show the unique electrolytic cleansing mechanism. The final take up spool is at 100. The initial spool is at 200. The wire 110 feeds from spool 200 through first electrolytic chamber 121 to second electrolytic chamber 131, then to power spray rinse 130 and finally to high pressure air drying chamber 120.

After passing through all of these stages, the wire 110 is wound on to the final take up spool 100. At this point the spool is either packaged with desiccant, as previously mentioned, or is cut into rods and packaged.

A great advance in this procedure is that in the the billet extrusion of packages of the rods, in the manner as is known to those skilled in the art, there can be gross contamination of the rods by the metallurgical bonding and diffusion of metal powders, resulting in a requirement for extensive acid treatment, mechanical sizing, grinding the like, all of which are most undesirable.

As the final improvement (not illustrated specifically in the drawings, as this is not necessary for an understanding by those skilled in the art). We now use boron nitride as a lubricating and sealing agent for billet extrusion. This is an excellent development. But, we have now discovered a unique additional step of using potassium silicate as a final coating over the boron nitride which acts to reduce chipping during the packing of the rods.

It must be understood that we have finally developed a method, beyond our original method, where we have been able to improve on our already superior product.

Figure 4:
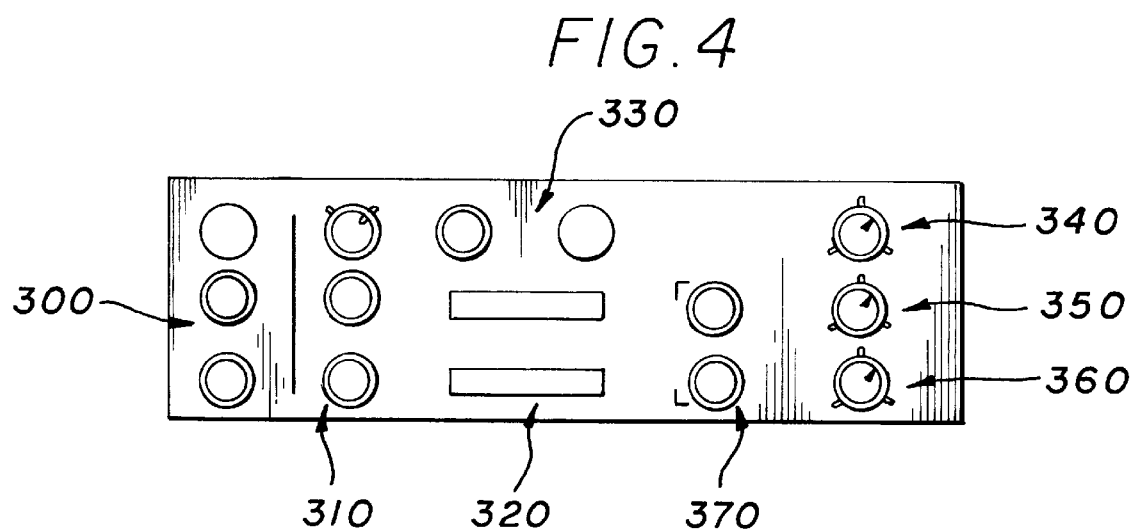
FIG. 4 is a front elevation of a control panel utilized in the apparatus of FIGS. 2 and 3.

A unique control panel has, also, been developed by us to accomplish our overall method. This is shown in FIG. 4. The power indication and activation is at 300. The automatic system activation and condition is shown at 310. The electrical condition is shown at 320. The reset controls are at 370. Tension, traverse rate, and wire speed are indicated at 340, 350, and 360 respectively.

In our present packaging system we have several steps which result in virtually perfect preservation of our welding rod. The packaging system includes the use of vapor barrier foil envelopes, providing a desiccant within the envelopes, evacuating air from the envelopes and replacing the same by inert gas, sealing the envelopes, and using a final outer protective package to protect the envelopes.

While the embodiments of this invention as shown and described are fully capable of achieving the objects and advantages of this invention, such embodiments are for purposes of illustration, only, and not for purposes of limitation.

We claim:

1. The method for producing high quality welding rods which consists of: the following procedures vacuum forming of ingots, shapes, billets, bars and wire hereafter jointly referred to as "shapes" a multiplicity of times; constant mechanical removal of oxides from the exterior surfaces of all shapes; cogging and hot rolling redraw bars from ingots and billets; performing ultrasonic inspection at each of the foregoing procedures; electrolytic cleaning of all shapes; performing vacuum annealing of the shapes; cutting and straightening shapes; hand wiping the shapes with solvent; attaching identification tags to the shapes; enclosing the shapes in vapor barrier foil envelopes; placing desicant in the envelopes; evacuating air from the envelopes and replacing the air with inert gas; sealing the envelopes; placing the envelopes in a protective outer package.

2. The method of lubricating and protecting welding rod including: 1 coating each individual rod with boron nitride; and coating each boron nitride coated rod with potassium silicate.

3. A welding rod comprising: an elongate length of welding rod material; a coating of boron nitride completely covering the elongate length of welding material; and a coating of potassium silicate completely encasing the boron nitride covering over the elongate length of welding material.

\* \* \* \* \*